United States Patent [19]
Kleewein et al.

[11] Patent Number: 5,987,465
[45] Date of Patent: *Nov. 16, 1999

[54] SYSTEM, METHOD AND COMPUTER PROGRAM PRODUCT FOR POSITIONED UPDATE SUPPORT

[75] Inventors: James C. Kleewein; Eileen T. Lin, both of San Jose; Yun Wang, Saratoga, all of Calif.

[73] Assignee: International Business Machines Corporation, Armonk, N.Y.

[ * ] Notice: This patent is subject to a terminal disclaimer.

[21] Appl. No.: 08/937,792

[22] Filed: Sep. 25, 1997

Related U.S. Application Data

[63] Continuation of application No. 08/314,644, Sep. 29, 1994.
[51] Int. Cl.$^6$ .................................................. G06F 15/173
[52] U.S. Cl. ............................... 707/10; 707/4; 707/102; 395/200.31; 395/200.47; 395/200.53
[58] Field of Search .................................. 707/4, 10, 102; 395/200.31, 200.47, 200.53

[56] References Cited

U.S. PATENT DOCUMENTS

| | | | |
|---|---|---|---|
| 4,714,989 | 12/1987 | Billings | 364/200 |
| 4,714,995 | 12/1987 | Materna et al. | 364/200 |
| 4,881,166 | 11/1989 | Thompson et al. | 364/200 |
| 5,046,002 | 9/1991 | Takashi et al. | 364/200 |
| 5,058,000 | 10/1991 | Cox et al. | 364/200 |
| 5,142,470 | 8/1992 | Bristow et al. | 364/184 |
| 5,161,158 | 11/1992 | Chakravorty et al. | 371/15.1 |
| 5,239,577 | 8/1993 | Bates et al. | 379/201 |
| 5,247,664 | 9/1993 | Thompson et al. | 395/600 |
| 5,257,366 | 10/1993 | Adair et al. | 395/600 |
| 5,278,978 | 1/1994 | Demers et al. | 395/600 |
| 5,301,302 | 4/1994 | Blackard et al. | 395/500 |
| 5,345,587 | 9/1994 | Fehskens et al. | 395/650 |
| 5,375,207 | 12/1994 | Blakely et al. | 395/200 |
| 5,381,534 | 1/1995 | Shi | 395/200 |
| 5,390,320 | 2/1995 | Smithline | 395/500 |
| 5,416,917 | 5/1995 | Adair et al. | 395/500 |
| 5,459,860 | 10/1995 | Burnett et al. | 395/600 |
| 5,493,671 | 2/1996 | Pitt et al. | 395/600 |
| 5,522,066 | 5/1996 | Lu | 395/600 |
| 5,561,797 | 10/1996 | Gilles et al. | 395/600 |
| 5,581,749 | 12/1996 | Hossain et al. | 395/600 |
| 5,581,758 | 12/1996 | Burnett et al. | 395/614 |
| 5,640,550 | 6/1997 | Coker | 707/4 |
| 5,689,633 | 11/1997 | Cotner et al. | 395/182.14 |

OTHER PUBLICATIONS

Arbee L. P. Chen, "A Localized Approach to Distributed Query Processing," Published in the *Proceedings of the International Conference on Extending Database Technology*, Venice, Italy, Mar. 26–30, 1990, pp. 188–202.

S.M. Deen et al., "Query Decomposition in PRECI*," *Distributed Data Sharing Systems*, Elsevier Science Publishers B.V. (North Holland), pp. 91–103, 1985.

M. Rusinkiewicz et al., "Query Transformation in Heterogeneous Distributed Database Systems," *IEEE*, pp. 300–307, 1985.

Clement, T. Yu et al., "Query Processing in a Fragmented Relational Distributed System: Mermaid," *IEEE Trans. on Software Engineering*, vol. SE–11, No. 8, pp. 795–810, Aug. 1985.

M. Rusinkiewicz et al., "An Approach to Query Processing in Federated Database Systems," *Proc. of the Twentieth Annual Hawaii Intl' Conf. on System Sciences*, pp. 430–440, 1987.

S. Kang et al., "Global Query Management in Heterogeneous Distributed Database Systems," *Microprocessing and Microprogramming*, vol. 38, pp. 377–384, 1993.

*Primary Examiner*—Jean R. Homere
*Attorney, Agent, or Firm*—Gates & Cooper

[57] ABSTRACT

A system, method and computer program product for providing a common interface to a plurality of heterogeneous database management systems, wherein date associated with a client is distributed among the plurality of hetergeneous database management systems. The system simulates support of positioned update actions in any of the heterogeneous database management systems which does not support positioned update actions.

6 Claims, 8 Drawing Sheets

SYSTEM, METHOD AND COMPUTER PROGRAM PRODUCT FOR POSITIONED UPDATE SUPPORT

This application is a continuation of application Ser. No. 08/314,644, filed Sep. 29, 1994, (status: pending).

CROSS-REFERENCE TO OTHER APPLICATIONS

The following applications of common assignee contain some common disclosure, and are believed to have an effective filing date identical with that of the present application:

U.S. Patent Application entitled "Performance Optimization In a Heterogeneous, Distributed Database Environment", application Ser. No. 08/314,643 (status: abandoned).

U.S. Patent Application entitled Query Pass Through In A Heterogeneous, Distributed Database application Ser. No. 08/310,799 (status: U.S. Pat. No. 5,764,949).

U.S. Patent Application entitled "Push Down Optimization in a Distributed, Multi-Database System", application Ser. No. 08/310,797 (status: U.S. Pat. No. 5,588,150).

The above-listed applications are incorporated herein by reference in their entireties.

DESCRIPTION

1. Technical Field

The present invention relates generally to computer database systems, and more particularly to functional compensation in a heterogeneous, distributed database environment.

2. Background Art

In modern data processing environments, a client's data is often distributed among a plurality of heterogeneous database systems (more precisely, a client's data is distributed among a plurality of database instances which were instantiated from different database management systems). "Heterogeneous database systems" are database systems that have different data definition and manipulation procedures, security procedures, system management approaches, capabilities, etc. Examples of "heterogeneous database systems" include DB2 produced by International Business Machines (IBM) Corporation, Oracle produced by Oracle Corp., Sybase produced by Sybase Inc., etc. Such heterogeneous database systems, when used together, collectively represent a heterogeneous, distributed database environment (or system). Heterogeneous, distributed database systems are also sometimes called federated database systems and/or multi-database systems.

In order to enhance user-friendliness, it is preferred that clients be provided with a common interface to all of the heterogeneous database systems (heterogeneous database systems to which a client is not directly connected are called back-end database systems, or simply back-ends). In other words, it is preferred that clients be under the illusion that they are interacting with a single database system.

One conventional approach for achieving this goal is to introduce an interface module between the clients and the back-end database systems. This interface module, also called database middleware or data access middleware, attempts to provide to clients transparent access to the back-end database systems. Generally speaking, the interface module receives data definition and manipulation instructions from clients. The interface module translates these instructions such that they are understandable to the appropriate back-end database systems, and then transfers the translated instructions to the appropriate back-end database systems. Similarly, the interface module translates information and messages received from the back-end database systems such that they are understandable to the appropriate clients, and then transfers the translated information and messages to the appropriate clients.

Generally, back-end database systems support different sets of functions. For example, some back-end database systems (such as DB2) support the declaration of cursors "with hold". Other back-end database systems (such as current versions of Oracle and Sybase) do not support this function.

Some conventional interface modules address this functional dissimilarity problem by relying on a "least-common denominator" approach wherein the only functions that are supported are those functions that are supported by all of the back-ends. This is not an optimal approach, however, because it does not allow clients to take advantage of all of the functions offered by all of the back-ends.

Other conventional interface modules address the functional dissimilarity problem by disallowing the use of functions when operating with back-ends that do not support the functions. Such functions are allowed when operating with back-ends that do support the functions. This is not an optimal approach, however, since it violates location transparency. That is, clients must be aware of which back-ends they are interacting with.

Thus, what is needed is an improved system and method for addressing the functional dissimilarity problem in a heterogeneous, distributed database environment.

DISCLOSURE OF INVENTION

The present invention is directed to a system and method of compensating for functional differences between heterogeneous database management systems, wherein data associated with a client is distributed among the heterogeneous database management systems. The present invention simulates support of multiple pending actions on a single connection in any of the heterogeneous database management systems which does not support multiple pending actions on a single connection. Also, the present invention: (1) simulates support of cursors declared "with hold" in any of the heterogeneous database management systems which does not support cursors declared "with hold"; (2) simulates support of positioned update actions in any of the heterogeneous database management systems which does not support positioned update actions; (3) simulates support of host variables in any of the heterogeneous database management systems which does not support host variables; and (4) compensates for security log-in procedure differences between the heterogeneous database management systems.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF DRAWINGS

The present invention will be described with reference to the accompanying drawings, wherein.

BEST MODE FOR CARRYING OUT THE INVENTION

1. Overview of the Present Invention

For illustrative purposes, the present invention is sometimes described herein using well known SQL concepts, statements, and syntax. As will be appreciated, SQL (structured query language) is a well known database language originally developed by International Business Machines (IBM) Corporation, and now supported by many relational database vendors, and defined by various standards bodies, such as the American National Standards Institute (ANSI). It should be understood, however, that reference is made to SQL for convenience purposes only. The present invention is intended and adapted to operate with database management systems which do not support SQL.

Figure 1:
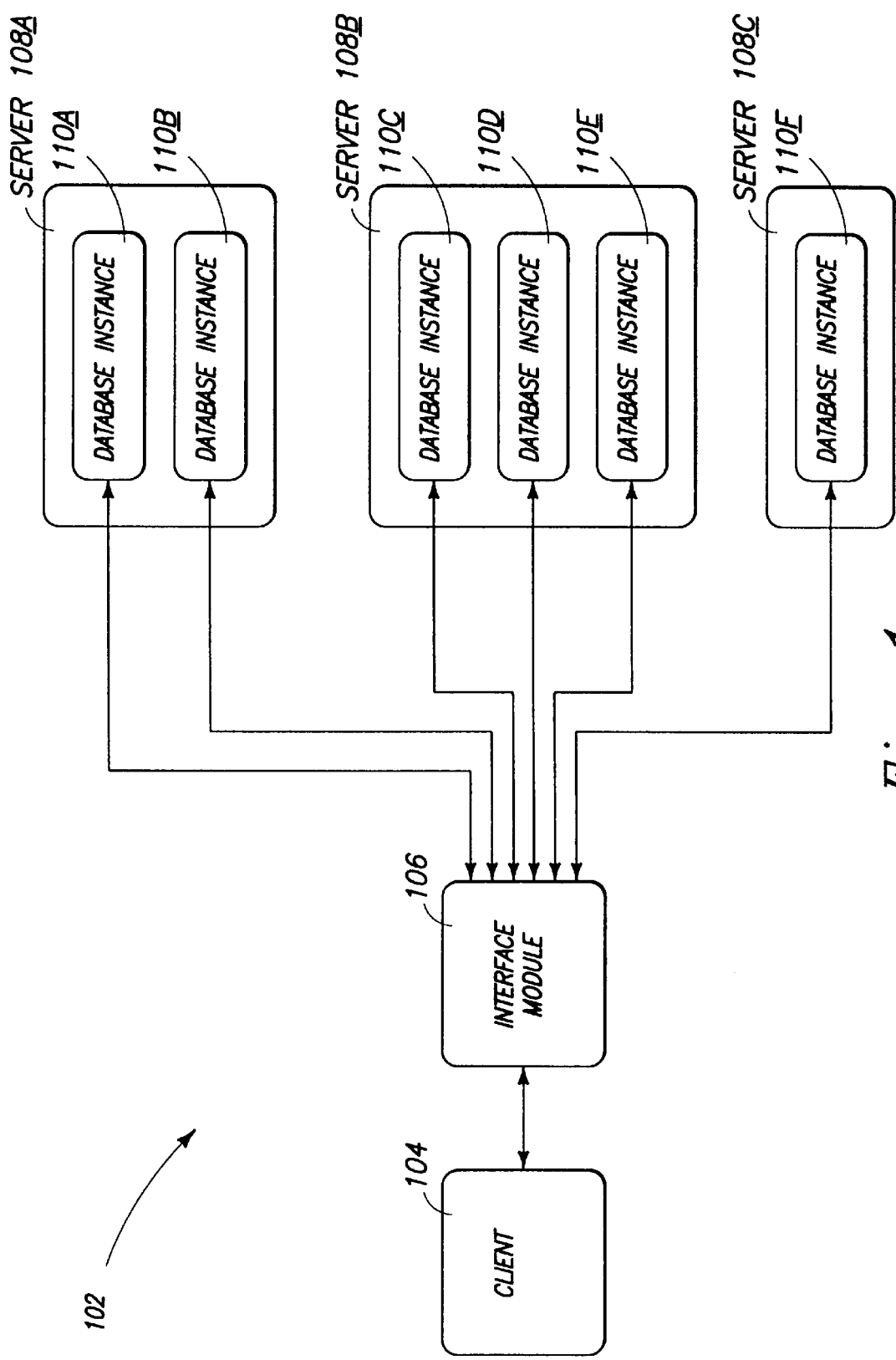
FIGS. 1 and 2 are block diagrams of a heterogeneous, distributed database system according to a preferred embodiment of the present invention.

FIG. 1 is a block diagram of a heterogeneous, distributed database system 102 according to a preferred embodiment of the present invention. The heterogeneous, distributed database system 102 includes one or more client application processes (also called, simply, "clients"), collectively represented by client 104.

Client 104 is connected to a plurality of instances of back-end database management systems (DBMS) (such as database instances 110A–110F) via an interface module 106. The database instances 110A–110F represent instantiations of a plurality of heterogeneous database management systems, such as DB2 produced by International Business Machines (IBM) Corporation, Oracle produced by Oracle Corp., Sybase produced by Sybase Inc., as well as other relational DBMS. Such heterogeneous database management systems may also include non-relational DBMS, flat files, etc.

The database instances 110A–110F execute on a plurality of servers 108A–108C. In the example of FIG. 1, database instances 110A and 110B execute on server 108A, database instances 110C, 110D, and 110E execute on server 108A, and database instance 110F executes on server 108F.

The interface module 106 provides clients 104 with a common interface to all of the database instances 110A (i.e., all of the back-end database systems). By operation of the interface module 106, the clients 104 are placed under the illusion that they are interacting with a single database system containing all of the data stored in database instances 110A–110F.

Generally, the database instances 110A–110F support different sets of functions (more precisely, the database management systems from which the database instances 110A–110F were instantiated support different sets of functions). For example, database instances 110A and 110B may support functions that are not supported by database instances 110C–110F.

According to the present invention, the interface module 106 compensates for such functional deficiencies (i.e., the interface module 106 performs functional compensation). Specifically, the interface module 106 simulates the existence of certain functions in database instances 110A–110F that are instantiated from database management systems that do not natively support such functions. Consequently, the present invention is superior to conventional interface modules since the present invention does not compromise location and functional transparency.

The interface module 106 is discussed in detail below.

2. Preferred Structure of the Present Invention

Figure 2:
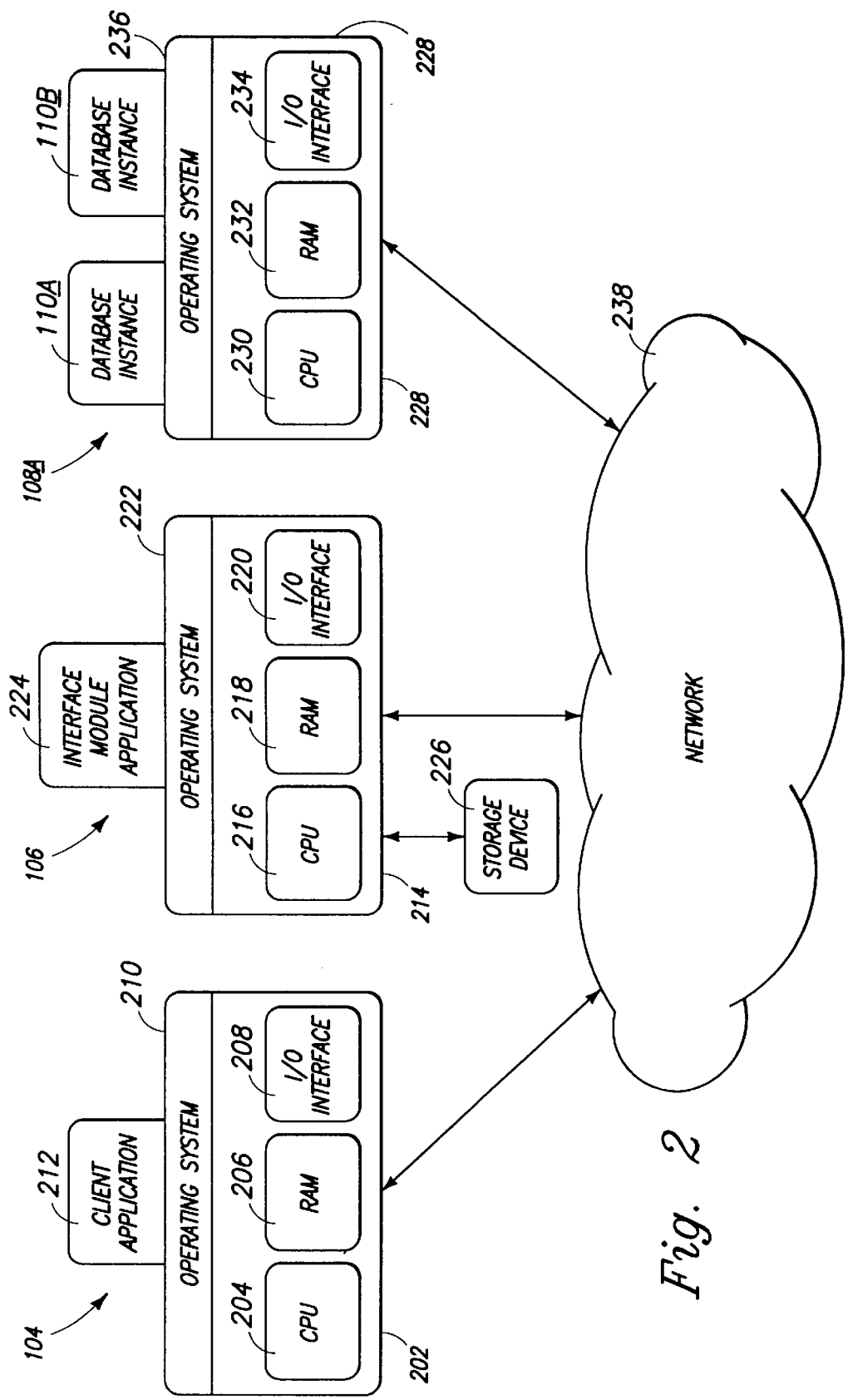

Referring to FIG. 2, the client 104 is preferably implemented as a client application program 212 operating on a computer platform comprising a computer 202 and an operating system 210. The computer 202 includes various hardware components, such as one or more central processing units (CPU) 204, a random access memory (RAM) 206, and an input/output (I/O) interface 208. The client application program 212 includes instructions for defining and manipulating data in databases maintained by the database instances 110A–110F. The operating system 210 may be implemented using any well known operating system suitable for executing the client application program 212, such as DOS, DOS/Windows, AIX, OS/2, HP-UX, and Sun OS. The computer 202 may be implemented using any well known computers that support these operating systems. It should be understood, however, that other computers and operating systems could alternatively be used without departing from the scope and spirit of the present invention.

The interface module 106 is preferably implemented as a data joiner application program 224 (preferably written in the C computer programming language) operating on a computer platform comprising a computer 214 and an operating system 222. The data joiner application program 224, when executed, enables the computer 214 to perform the features of the interface module 106 discussed herein. Thus, the data joiner application program 224 could be considered a controller of the computer 214.

The computer 214 includes various hardware components, such as one or more central processing units (CPU) 216, a random access memory (RAM) 218, and an input/output (I/O) interface 220.

Preferably, the computer 214 is the well known RISC System/6000 family of computers produced by IBM. Alternatively, the computer 214 is any computer that can run DB2 (produced by IBM) . The operating system 222 is preferably the well known AIX operating system produced by IBM. It should be understood, however, that other computers and operating systems could alternatively be used without departing from the scope and spirit of the present invention.

The computer 214 is connected to a number of peripheral devices, such as one or more storage devices. The storage devices may represent floppy drive units, hard drive units, tape backup units, etc. One such storage device, designated using reference number 226, is shown in FIG. 2.

A computer program product comprising a computer readable media having computer program logic recorded thereon, wherein the computer program logic when executed in the computer 214 enables the computer 214 to perform the functions of the present invention, may be read by and/or stored on the storage device 226. The computer program logic may then be loaded into the RAM 218, and executed by the CPU 216 of the computer 214. When executing in the CPU 216, the computer program logic is represented by the data joiner application program 224 as shown in FIG. 2.

As stated above, the database instances 110A–110F execute on a plurality of servers 108A–108C. Server 108A is shown in FIG. 2 (servers 108B and 108C are similar to server 108A). The server 108A is preferably implemented as a computer platform comprising a computer 228 and an operating system 236. The computer 228 includes various hardware components, such as one or more central processing units (CPU) 230, a random access memory (RAM) 232, and an input/output (I/O) interface 234. The operating system 210 may be implemented using any well known operating system suitable for executing the database instances 110A and 110B, such as MVS, VM, VSE, OS/400, OS/2, AIX, HP-UX, SUN OS, etc. The computer 228 may be implemented using any well known computers that support these operating systems. It should be understood, however, that other computers and operating systems could alternatively be used without departing from the scope and spirit of the present invention.

The computers 202, 214, and 228 are connected to a communication network 238, which may be implemented as a local area network (LAN) or a wide area network (WAN), for example. It should be understood, however, that other types of networks, such as a metropolitan area network (MAN), could alternatively be used without departing from the scope and spirit of the present invention. The client 104, interface module 106, and database instances 110A–110F communicate with each other over this network 238.

3. Compensation for Different Connection and Cursor Characteristics

The interface module 106 functionally compensates for a database management system's lack of support of multiple pending database actions (such as SQL actions) on a single connection. Also, the interface module 106 functionally compensates for a database management system's lack of support of declaring cursors "with hold". These capabilities of the interface module 106 shall now be described in detail.

As is well known, a connection is a logical link between a client and a database instance. Referring to FIG. 1, for example, before the client 104 can access data in a table maintained by database instance 110C, the client 104 must create a connection between itself and database instance 110C. (As is well known, a database comprises one or more tables, and a table comprises one or more rows, or touples.) The well known SQL "connect" statement can be used to create a connection between a client and a database instance (as is well known, the connect operation is often performed implicitly).

As is well known, a cursor is a window into a table. A cursor can be viewed as a pointer to rows in a table. One or more cursors may be associated with each connection. Referring again to FIG. 1, for example, before the client 104 can access data in a table maintained by database instance 110C, and after the client 104 has created a connection to database instance 110C, the client 104 must declare and then open a cursor. The well known SQL "declare cursor" statement is used to declare cursors. The well known SQL "open" statement is used to open cursors.

Some database management systems, such as DB2, support multiple actions on a single connection. For example, consider the following example code segment (Code Segment 1). Code Segment 1 is part of the client application program 212. It is written in pseudocode that is based on the SQL database language. Line numbers are provided to the left of each statement for reference purposes.

1 declare cursor C1 with hold
2 select name from emp_table
3 open C1
4 while more data
5 fetch C1
6 delete where name="Smith"
7 commit
8 end while
9 close C1

Code Segment 1

The statement at line 1 declares a cursor called "C1" on an existing connection (the statement that created this connection is not shown). The statement at line 2 indicates that the table "emp_table" (containing employee data) is to be used, and the statement at line 3 opens C1 as a window into emp_table. The statements at lines 4–8 represent a loop that iterates through the rows of emp_table. In particular, the statement at line 5 operates to fetch the row that is pointed to by cursor C1. The statement at line 6 deletes all rows in emp_table where the name field is equal to "Smith". Line 7 is a commit statement. The statement at line 9 closes the cursor C1.

In Code Segment 1, the database statements at lines 1, 3, 5, and 9 are explicitly associated with a particular cursor (i.e., cursor C1). Consequently, these database statements are explicitly associated with a particular connection (i.e., the connection associated with cursor C1). The database statement at line 6 is implicitly associated with a cursor and a connection.

In some database management systems, such as DB2, multiple actions on a single connection are supported. In such database management systems, the database statement at line 6 would be associated with the same connection as the database statements at lines 1, 3, 5, and 9. Consequently, two actions would be pending on this connection, the "open/fetch/close" action (lines 3, 5, and 9), and the delete action (line 6).

In other database management systems, however, multiple actions on a single connection are not supported. In such database management systems, any attempts to execute Code Segment 1 would result in an error. This is the case, since the database statement at line 6 could not be associated with the same connection as the database statements at lines 1, 3, 5, and 9. In order to execute without any errors, it would be necessary to modify Code Segment 1 to create an additional connection before the delete statement at line 6.

As noted above, the interface module 106 functionally compensates for a database management system's lack of support of multiple pending database actions (such as SQL actions) on a single connection. In particular, the data joiner 224 simulates the existence of this function (i.e., support of multiple pending database actions on a single connection) in those database instances 110A–110F that were instantiated from database management systems that do not natively support this function.

Some database management systems, such as DB2, support the declaration of cursors "with hold". If a cursor is declared "with hold", then it is not closed as a consequence of a commit operation (commit operations are well known to persons skilled in the relevant art). Conversely, cursors that are not declared "with hold" are closed as a consequence of a commit operation. The closing of a cursor operates to close the window into the table. The position of the cursor (i.e., the pointer to the table) is lost when the cursor is closed. Thus, by declaring a cursor "with holds", the position of the cursor is not lost when a commit operation is performed, since the cursor is not closed.

As noted above, the interface module 106 functionally compensates' for a database management system's lack of support of declaring cursors "with hold". In particular, the data joiner 224 simulates the existence of this function (i.e., allowing cursors to be declared "with hold") in those database instances 110A–110F that were instantiated from database management systems that do not natively support this function.

Figure 3:
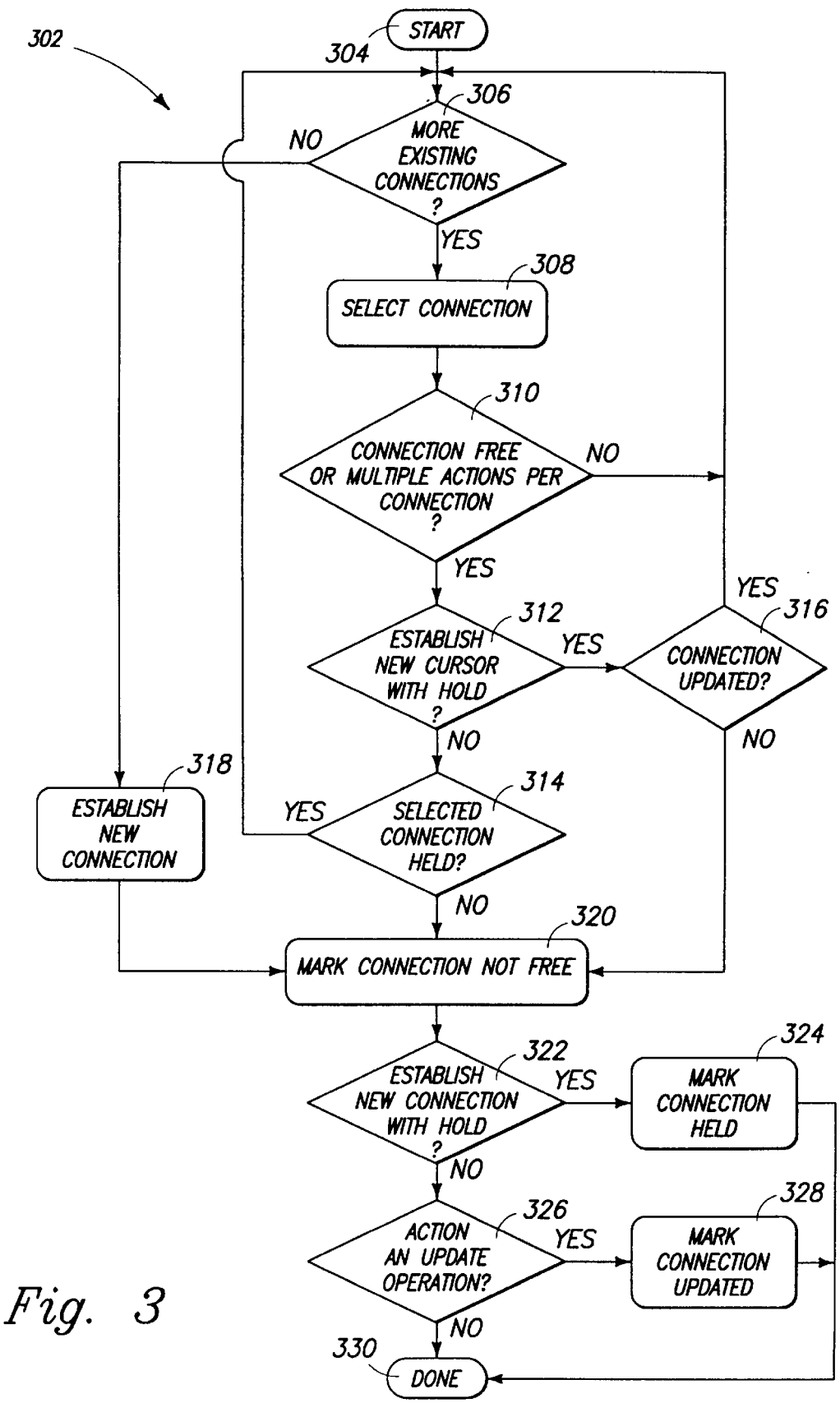
FIGS. 3–8 are flowcharts depicting the operation of the present invention.

Flowchart 302 in FIG. 3 depicts the manner in which the interface module 106 simulates the existence of these functions (i.e., allowing multiple database actions to be pending on a single connection, and allowing cursors to be declared "with hold") in database instances instantiated from database management systems that do not natively support these functions. Flowchart 302 (and all flowcharts contained herein) is of sufficient detail to enable one skilled in the relevant art to generate a computer program or a computer program product in accordance with the present invention. The interface module 106 performs the steps of flowchart 302 for each database statement (i.e., each SQL data manipulation statement) for which a connection has not already been defined. The interface module 106 receives this database statement from the client 104. Flowchart 302 begins with step 304, where control immediately passes to step 306.

In step 306, after receiving a database statement from the client 104 (this is called the "current database statement" for reference purposes), the interface module 106 determines whether any connections exist. A distinction must be made between the connections which are made via "connect" (or equivalent) statements contained in the client 104, and the connections which the interface module creates 106 in accordance with the present invention. For reference purposes, the former connections are called "user-created connections", and the latter connections are called "data joiner-created connections", or "DJ-created connections". Multiple DJ-created connections may be created by the interface module 106 to support each user-created connection. In step 306, the interface module 106 determines whether any DJ-created connections exist.

If no more DJ-created connections exist (or all existing DJ-created connections have already been processed), then step 318 is performed (described below). Otherwise, step 308 is performed.

In step 308, the interface module 106 selects one of the existing DJ-created connections for processing.

In step 310, the interface module 106 determines in a well known manner whether the selected connection is free (i.e., no pending actions on the selected connection), or whether the selected connection is associated with a database management system that supports multiple pending actions on each connection. If either of these conditions is true, then it might be possible to use this selected connection to support (i.e., to execute) the current database statement. Thus, control passes to step 312 to further process the selected connection (discussed below). However, if neither of these conditions is true, then it is not possible to use this selected connection to support the current database statement. This is the case, since an action is pending on the selected connection, and the selected connection is associated with a database management system that supports only a single pending action on each connection. Thus, control returns to step 306 to select another existing DJ-created connection for processing.

If it is determined in step 310 that the selected connection is free, or that the selected connection is associated with a database management system that supports multiple pending actions on each connection, then step 312 is performed. Step 312 (and also step 316) represents a portion of the operation of the interface module 106 when functionally compensating for a database management system's lack of support of declaring cursors "with hold".

As stated above, a cursor that has been declared "with hold" is not closed when a commit operation is performed. When processing a statement that declares a cursor "with hold", the interface module 106 must assign a connection to support the statement (and to support the new cursor). In order to effectuate the "with hold" functionality, commit operations must not be allowed to affect the cursors associated, in the past or presently, with the connection assigned to the new cursor. To do otherwise would result in the new cursor being closed with the next commit operation, which would violate the semantics pertaining to the "with hold" functionality. Accordingly, the connection assigned to the new cursor must not be one on which updates have been made, since such updates should be committed when the next commit operation is executed.

Accordingly, in step 312, the interface module 106 determines in a well known manner whether the current database statement is a statement that declares a new cursor "with hold". If it is determined that the current database statement is a statement that declares a new cursor "with hold", then step 316 is performed (otherwise, step 314 is performed, described below). In step 316, the interface module 106 determines whether any table updates have been made on the selected connection. If any table updates have been made on the selected connection, then the interface module 106 determines that the selected connection cannot be used to support the current database statement. Accordingly, control returns to step 306 to select another existing DJ-created connection for processing. Otherwise, step 320 is performed (described below).

If it is determined in step 312 that the current database statement does not represent a statement that declares a new cursor "with hold", then step 314 is performed. In step 314, the interface module 106 determines in a well known manner whether the selected connection was originally declared "with hold". Update operations should not be performed on cursors that have been declared "with hold". This is the case, since (as described above) such updates will not be committed when the next commit statement is executed. The interface module 106 assumes that the current database statement is an update instruction. Accordingly, if it is determined in step 314 that the selected connection was originally declared "with hold", then the interface module 106 determines that it is not possible to use the selected connection to support the current database statement. Accordingly, control returns to step 306 to select another existing DJ-created connection for processing.

If it is determined in step 314 that the selected connection was not originally declared "with hold", then step 320 is performed. Recall that step 320 is also performed if (1) the new cursor was declared "with hold". (step 312), and (2) no updates have been made on the selected connection (step 316). In step 320, the interface module 106 determines that the selected connection can be used to support the current database statement. Accordingly, in step 320 the interface module 106, in a well known manner, marks the selected connection as being "not free". Recall that this status information is used in step 310, described above.

In step 322, the interface module 106 determines in a well known manner whether the current database statement is a statement that declares a new cursor "with hold". Note that this is the same question that was asked in step 312. If it is determined that the current database statement is a statement that declares a new cursor "with hold", then the interface module 106 in step 324 marks the selected connection as being held. This status information, which is used in step 314, indicates that the selected connection is being used with at least one cursor that was originally declared "with hold". After step 324 is executed, the operation of flowchart 302 is complete, as indicated by step 330.

If it is determined in step 322 that the current database statement is not a statement that declares a new cursor "with hold", then step 326 is performed. In step 326, the interface module 106 determines whether the current data manipulation instruction is an update type operation (i.e., instructions which cause data to be inserted into tables, which cause data in tables to be updated, which cause data in tables to be deleted, which cause the creation of new tables, which cause tables to be destroyed, which cause indexes to be modified, created, or destroyed, etc.). If the current data manipulation instruction is an update operation, then the interface module 106 in step 328 marks the selected connection as having been updated (i.e., an update having been performed on the selected connection). This status information is used in step 316. After step 328 is executed, the operation of flowchart 302 is complete, as indicated by step 330.

Recall that step 318 is performed if it is determined in step 306 that all of the existing DJ-created connections have been processed, or no DJ-created connections exist. In step 318, the interface module 106 creates a new DJ-created connection. This new DJ-created connection is used to support the current database statement. Control then flows to the sequence of steps beginning with step 320. Such steps were described above.

Flowchart 302 shall now be further described by way of an example. This example makes use of example Code Segment 2, below. Code Segment 2 is part of the client application program 212. It is written in pseudocode that is based on the SQL database language. Line numbers are provided to the left of each statement for reference purposes.

1 declare cursor C1 with hold
2 select name from emp_table
3 open C1
4 while more data
5 fetch C1
6 delete where name="Smith"
7 commit
8 end while
9 close C1
Code Segment 2

The steps of flowchart 302 are performed when processing the "open" statement at line 3. Assume that, prior to executing Code Segment 2, no DJ-created connections exist. Also assume that the target database management system does not support multiple pending actions on a connection, or declaring cursors with hold.

In processing the "open" statement at line 3, the interface module 106 determines in step 306 that there are no existing DJ-created connections, so step 318 is performed. In step 318, a new DJ-created connection is created (called CONN1 for reference purposes). CONN1 is marked as being not free in step 320, and is marked as being held in step 324.

The steps of flowchart 302 are not performed when processing the "fetch" statement at line 5, since a cursor C1 and a connection CONN1 are already defined for this statement.

The steps of flowchart 302 are performed when processing the "delete" statement at line 6. In processing this "delete" statement, the interface module 106 determines in step 306 that CONN1 exists. In step 308, CONN1 is selected. In step 310, it is determined that CONN1 is not free, and that the target database management system does not support multiple pending actions on a single connection. Thus, control returns to step 306, wherein it is determines that no more DJ-created connections exist. Step 318 is performed, wherein a new DJ-created connection CONN2 is created. In step 320, CONN2 is marked as not free, and in step 328, CONN2 is marked as updated.

Figure 4:
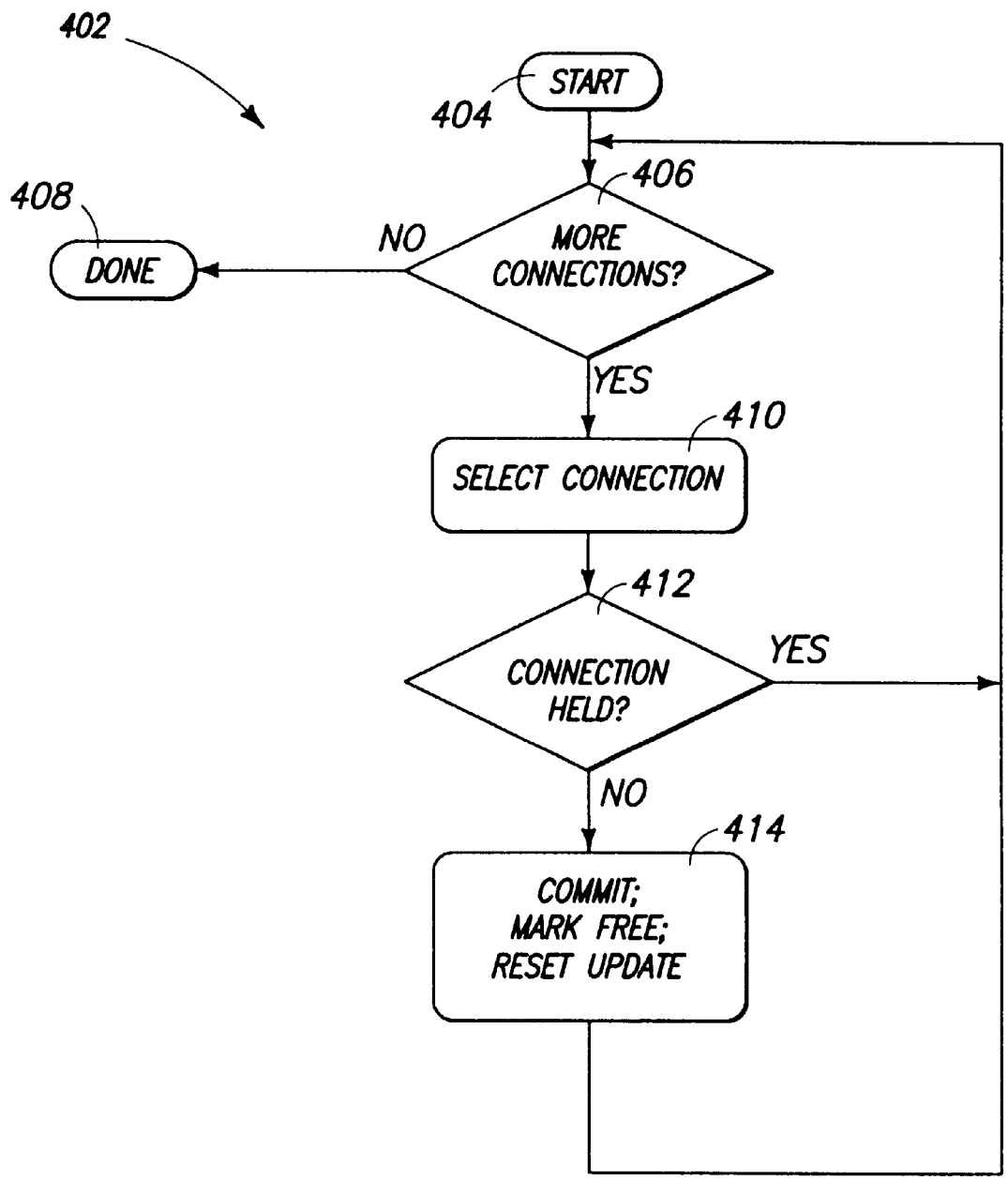

FIG. 4 illustrates a flowchart 402 that represents the operation of the interface module 106 when processing a commit instruction received from the client 104 (as will be appreciated, commits can also occur implicitly). Flowchart 402 begins with step 404, where control immediately passes to step 406.

In step 406, the interface module 106 determines whether there are any additional DJ-created connections to process. If there are no more DJ-created connections to process, then the operation of flowchart 402 is complete, as indicated by step 408. Otherwise, step 410 is performed.

In step 410, the interface module 106 selects one of the DJ-created connections to process.

In step 412, the interface module 106 determines whether the selected connection is held. If the selected connection is held, then the interface module 106 does not allow the commit operation to affect the cursor(s) associated with the selected connection. Accordingly, control returns to step 406 to select the next DJ-created connection.

If the selected connection is not held, then in step 414 the interface module 106 allows the commit operation to affect the cursor(s) associated with the selected connection, such that the cursors are committed, marked free, and marked as not being updated. Then, control returns to step 406.

Figure 8:
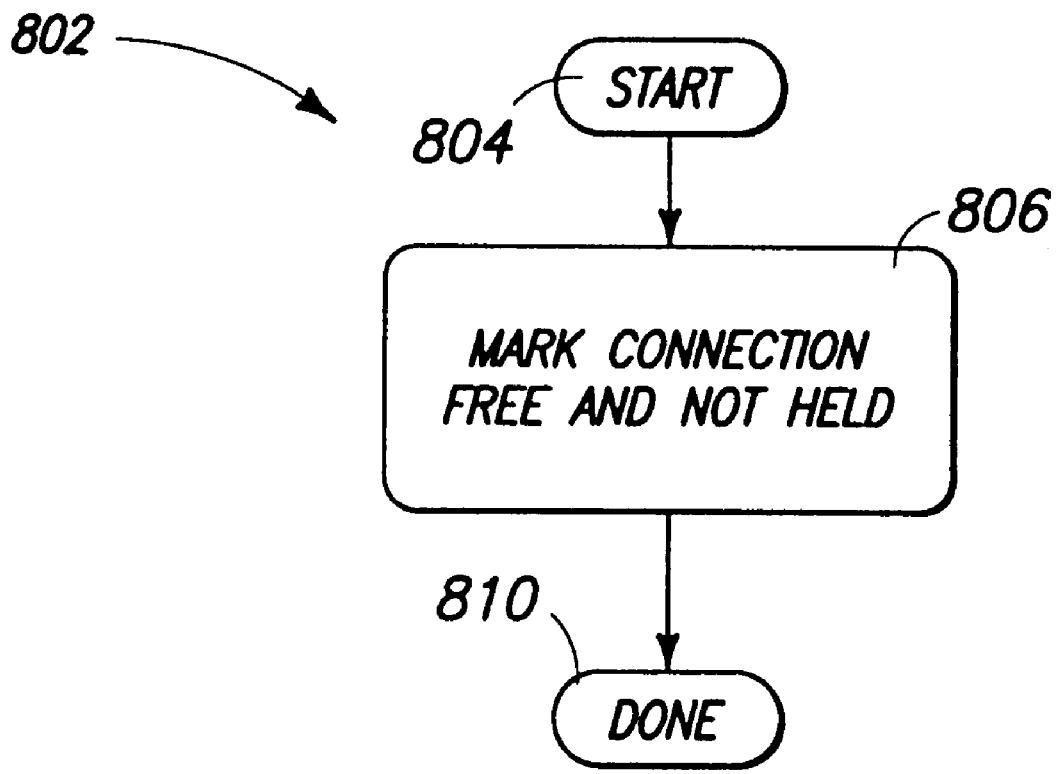

FIG. 8 illustrates a flowchart 802 that represents the operation of the interface module 106 when processing a close statement, such as the close statement at line 9 in Code Segment 2. The steps of flowchart 802 are only performed when the target database management system does not support multiple pending actions on a single connection. As represented by step 806, when processing a close statement, the interface module 106 marks the connection associated with the cursor being closed (i.e., C1) as being free and not held.

Thus, as will be appreciated by persons skilled in the relevant art based on the above discussion, the interface module 106 allows multiple database actions to be pending on a single connection, even in database management systems that do not natively support this function, by automatically associating an existing connection or a new connection with a new action (i.e., the current database statement), wherein the connection assigned to the new action is not the same as the connections associated with pending actions.

Also, the interface module 106 allows cursors to be declared "with hold", even in database management systems that do not natively support this function, by automatically associating an existing connection or a new connection with a new action (i.e., the current database statement), wherein the connection assigned to the new action is not the same as the connections associated with pending actions, and by allowing commit operations to only affect connectors that are not held.

The above actions are performed automatically by the interface module 106, such that support of the above functions is transparent to users and clients.

It should be noted that, if the cursor is (1) with hold, (2) has an associated positioned update, (3) is directed to a back-end that supports multiple actions per connection, and (4) is directed to a back-end that does not natively support cursor hold, then the positioned update must be performed on (a) a connection that will get committed, i.e., not the cursor hold connection, and (b) preferably use the positioned update technique described below.

For example, consider the following example pseudocode:

1 declare cursor C1 with hold
2 select name from emp_table
3 open C1
4 while more data
5 fetch C1
6 if name is not 'Bob Smith'
7 delete where current of cursor C1

```
8 commit
9 end while
10 close C1
```
Code Segment 3

In this case, the delete statement in line 7 must be committed by the commit statement in line 8. Thus, the delete statement must not be performed under the connection for the cursor hold connection, even though it explicitly references that connection via cursor C1.

4. Positioned Update Support

Some database management systems do not support positioned updates. For example, consider Code Segment 4, which is part of the client application program 212. It is written in pseudocode that is based on the SQL database language. Line numbers are provided to the left of each statement for reference purposes.

```
1 select name from emp_table
2 open C1
3 while more data
4 fetch C1
5 delete where C1 is currently located
7 end while
8 close C1
```
Code Segment 4

Code Segment 4 is similar to Code Segments 1 and 2. Line 5 in Code Segment 4 represents a positioned update statement, wherein the update operation (a delete operation in this example) is being performed on the row identified by the current position of a specified cursor (cursor C1 in this example).

Some database management systems do not support positioned updates. Any attempts to execute Code Segment 4 in such database management systems would result in an error.

Figure 5:
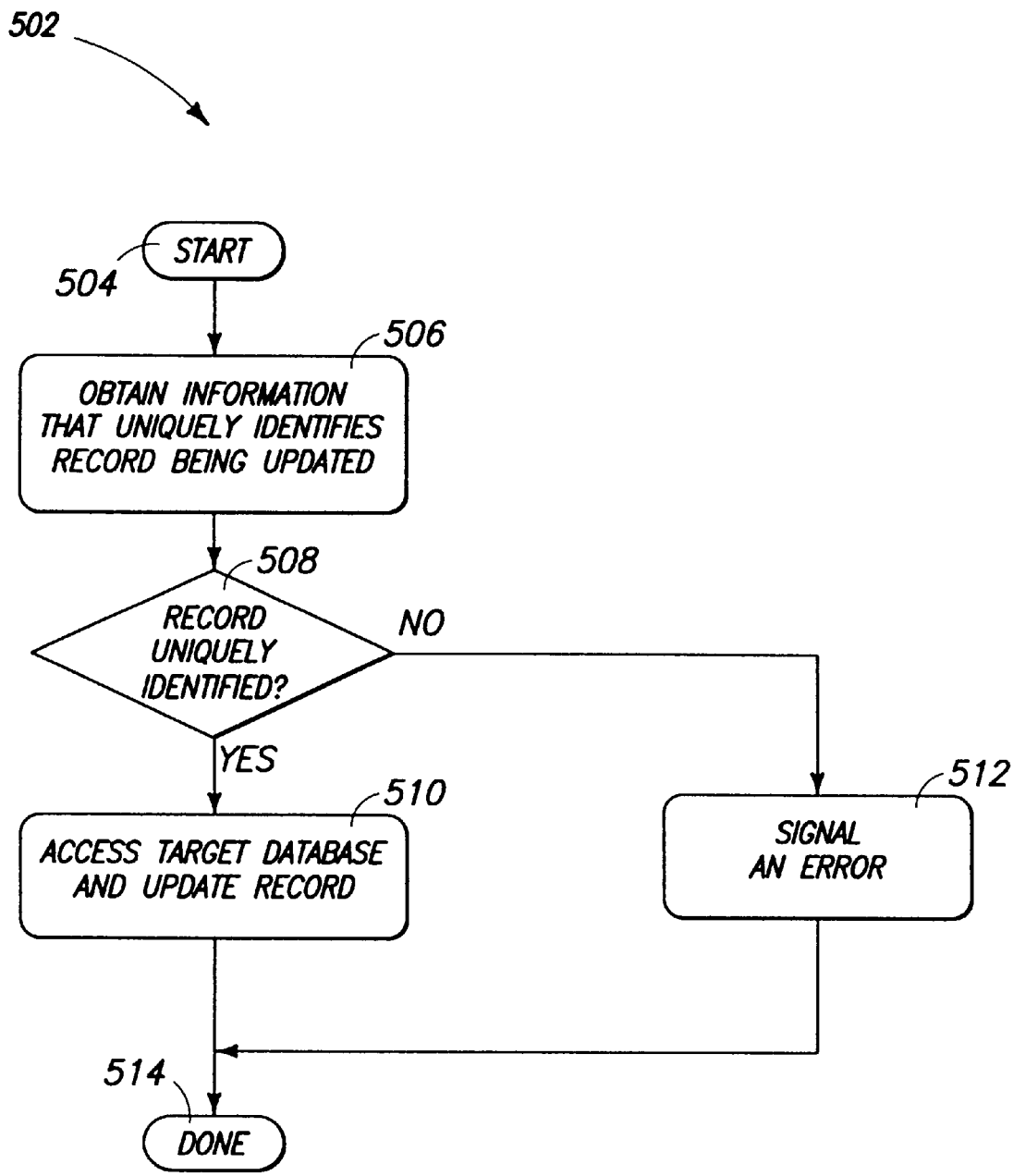

The interface module 106 of the present invention functionally compensates for a database management system's lack of support of positioned updates. Flowchart 502 in FIG. 5 represents the operation of the interface module 106 when performing such functional compensation. The steps of flowchart 502 are performed whenever the interface module 106 processes a positioned update statement (such as the instruction at line 5 of Code Segment 4). Flowchart 502 begins with step 504, where control passes immediately to step 506.

In step 506, the interface module 106 obtains information from the target database management system that uniquely identifies the record that is being updated by the positioned update statement. The "target database management system" is the DBMS which maintains the table containing the record that is being modified by the positioned update statement.

The information obtained in step 506 may comprise the unique record number (also called record identifier, or RID) of the record being updated. The interface module 106 may have obtained this unique record number from the target DBMS as a consequence of performing the preceding "fetch" instruction (line 4 in Code Segment 4).

Not all database management systems return the unique record number when processing fetch instructions. When operating with such database management systems, the interface module 106 relies on other data to uniquely identify the record being updated.

Preferably, the interface module 106 accesses metadata pertaining to the table in question (i.e., the table containing the record being updated) to identify primary keys defined for the table. As is well known, such metadata represents data pertaining to the data in tables, and includes information such as the number of fields in each record, the name of each field, the data type and precision (if applicable) of each field, the indexes defined for the table, etc. Such metadata also contains information that identifies the primary keys defined for the table. As is well known, the data contained in a primary key field is unique for each record.

Thus, the interface module 106 in step 506 accesses metadata pertaining to the table in question to identify primary keys defined for the table. Then, the interface module 106 accesses the target DBMS and retrieves information contained in one or more of the primary key fields for the record being updated. This retrieved information should uniquely identify the record being updated. For example, in a table containing employee information, the interface module 106 may retrieve the Social Security Number from the record being updated.

In step 508, the interface module 106 determines whether it was able in step 506 to obtain information that uniquely identifies the record being updated. The interface module 106 would not have been able to obtain information that uniquely identifies the record being updated if, for example, no primary keys were defined for the table in question.

If it is determined that information was obtained that uniquely identifies the record being updated, then the interface module 106 in step 510 accesses the target DBMS and modifies the record in accordance with the positioned update instruction. The interface module 106 uniquely identifies the record by using the information obtained in step 506.

If, instead, it is determined that information was not obtained that uniquely identifies the record being updated, then the interface module 106 in step 512 signals an error, indicating that it was not possible to perform the positioned update instruction.

Operation of flowchart 502 is complete after performing steps 510 or 512, as indicated by step 514.

The above actions are performed automatically by the interface module 106, such that support of positioned update actions is transparent to users and clients.

5. Host Variable Support

A host variable is a variable in a client application program (in a host computer language such as C, Fortran, Cobol, Assembler, etc.) that is referred to in a database statement, such as a SQL statement. Host variables are so named because they are defined by statements of the host language.

Not all database management systems support host variables. The non-support of host variables makes it more difficult to write client application programs. For example, consider Code Segment 5, which is part of the client application program 212. It is written in pseudocode that is based on the SQL database language. Line numbers are provided to the left of each statement for reference purposes.

```
1 for i=1 to 3
2 insert into number_table values(i)
3 end for
```
Code Segment 5

In Code Segment 5, i is a host variable. The effect of the statement in line 2 is to store the value of i into the table "number_table" during each iteration of the "for" loop, such that the following values are stored in "number_table": 1, 2, 3.

Any attempts to execute Code Segment 5 in a DBMS that does not support host variables will result in an error. In order to achieve the same result, it would be necessary to modify Code Segment 5 as shown below in Code Segment 6.

```
1 insert into number_table values(1)
2 insert into number_table values(2)
3 insert into number_table values(3)
```
Code Segment 6

In other words, it would be necessary to replace the host variable with the equivalent literal values (ideally, such replacement would be done in an efficient manner, such that the number of times the replacement is done is minimized). Clearly, this places a burden on computer programmers, particularly if, for example, the "for" loop in Code Segment 5 iterated numerous times. Also, the modification shown in Code Segment 6 would not be possible if the values of the host variable were not known when the application was generated. Further, the modification shown in Code Segment 6 would be difficult to implement if the values of the host variable are difficult to represent with characters, such as a bit stream that represents digital images or digital sound.

Figure 6:
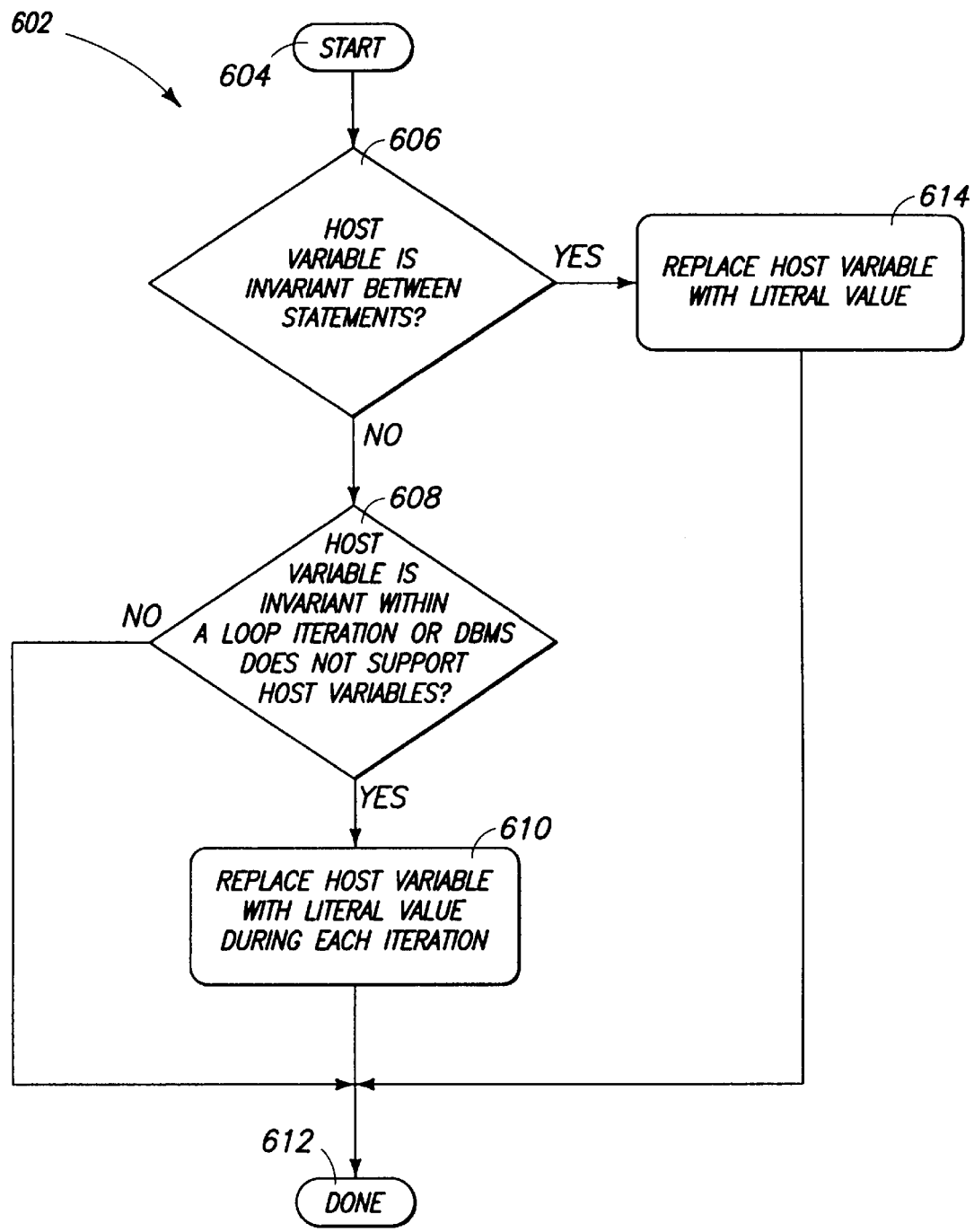

The interface module 106 of the present invention functionally compensates for a database management system's lack of support of host variables. Flowchart 602 in FIG. 6 represents the operation of the interface module 106 when performing such functional compensation. The steps of flowchart 602 are performed for each host variable in each statement that contains one or more host variables. Flowchart 602 begins with step 604, where control passes immediately to step 606.

In step 606, the interface module 106 determines whether the host variable is invariant between statements. A host variable is invariant between statements if the value of the host variable is always the same for every statement in the client application program. For example, the host variable "i" in Code Segment 5 is not invariant between statements because its value changes with each iteration of the "for" loop. Consequently, its value is not always the same for every statement (for example, the value of i as seen by the statement at line 3 is different for each iteration of the loop).

More precisely, a host variable is invariant between statements if: (1) it is declared a constant (such as a literal or a constant in the host language); (2) it is implicitly a constant for the execution of the application (such as a "special register" like CURRENT USER or CURRENT SERVER); or (3) code and data flow analysis indicates that the value of the host variable does not change once it is set. The manner in which the interface module 106 checks for these conditions will be apparent to persons skilled in the relevant art.

If it is determined in step 606 that the host variable is invariant between statements, then the interface module 106 in step 614 replaces the host variable with the literal value of the host variable. If, instead, it is determined in step 606 that the host variable is not invariant between statements, then step 608 is performed.

In step 608, the interface module 106 determines whether the host variable is invariant within a loop iteration (i.e., at the statement level), or whether the target back-end does not support host variables at all. A host variable is invariant within a loop iteration if the value of the host variable is the same for all statements during the duration of each loop iteration. More particularly, a host variable is invariant within a loop iteration if it is a single table statement that does not involve sub-queries. For example, the host variable "i" in Code Segment 5 is invariant within a loop iteration because its value is the same all statements during the duration of each loop iteration. That is, its value is "1" during the first iteration, "2" during the second iteration, and "3" during the third iteration.

If it is determined in step 608 that the host variable is invariant within a loop iteration, or that the target back-end does not support host variables, then the interface module 106 in step 610 replaces the host variable with the literal value of the host variable during each iteration of the loop. For example, during the first iteration of the loop in Code Segment 5, the interface module 106 replaces "values(i)" with "values(1)" in the statement of line 2. During the second and third iterations, the interface module 106 replaces "values(i)" with "values(2)" and "values(3)", respectively.

If, instead, it is determined in step 608 that the host variable is not invariant within a loop iteration, and that the target back-end supports host variables, then step 612 is performed. Step 612 represents the completion of flowchart 602.

The above actions are performed automatically by the interface module 106, such that support of host variables is transparent to users and clients.

6. Compensation for Different Security Procedures

Different database management systems have different security procedures for logging in to the database, and accessing data in the database. For example, in some database management systems, a user provides a user identification (user id) and a password to log into the local client machine, such as the client 104. The user's user id and password are the same for all database management systems, such that the user is automatically logged into the database instances 110A–110F (as the need arises).

In other database management systems, the user's user id and password are different at the client 104 and at the database management systems. Thus, even after the user has logged into the client 104, the user must provide his user id and password whenever he wishes to access one of the database instances 110A–110F.

The interface module 106 of the present invention functionally compensates for such differences in security procedures. In the present invention, the user need only log into the client 104. The interface module 106 automatically logs the user into the database instances 110A–110F, as the need arises. In this manner, the user is left with the impression that he is accessing only a single back-end database.

Figure 7:
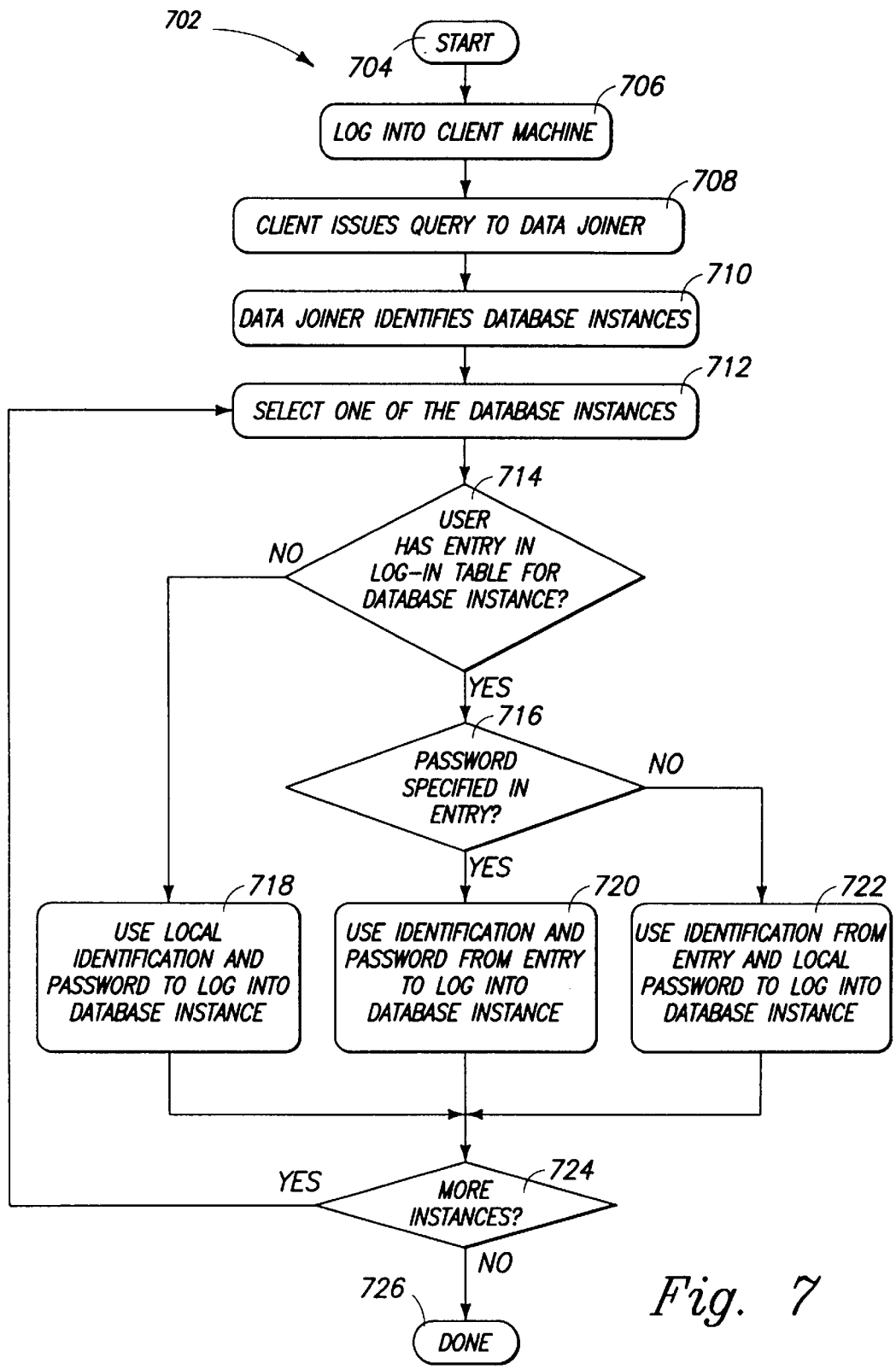

Flowchart 702 in FIG. 7 represents the operation of the interface module 106 when functionally compensating for differences in security procedures. Flowchart 702 begins with step 704, where control passes immediately to step 706.

In step 706, a user logs into the client 104 by providing his user id and password (called the local user id and password for reference purposes).

In step 708, the client 104 issues a query (i.e., a database instruction, such as a SQL instruction) to the interface module 106.

In step 710, the interface module 106 analyzes the query to identify the data instances 110A–110F who will be involved in processing the query. The interface module 106 automatically logs the user in at each of these data instances 110A–110F, as shall now be described.

In step 712, the interface module 106 selects one of the data instances identified in step 710.

The interface module 106 maintains a log-in table having a number of records associated with the user. In particular, this log-in table includes, for the user, up to one record for each of the database instances. Each of these records contains a first field that stores data that identifies the user's user id needed to log into the associated database instance, and a second field that stores data that identifies the user's password needed to log into the associated database instance.

In step 714, the interface module 106 determines whether the user has a record in the log-in table for the selected database instance. If such a record does not exist, then the interface module 106 assumes that the user's local user id and password are sufficient to log into the selected database instance. Accordingly, in step 718 the interface module 106 logs into the selected database instance using the user's local user id and password.

If, in step 714, it is determined that the user has a record in the log-in table for the selected database instance, then step 716 is performed. In step 716, the interface module 106 determines whether a password for the selected database instance is stored in this record of the log-in table (according to the present invention, the record must at least store the user id for the selected database instance). If a password for the selected database instance is stored in this record, then the interface module 106 in step 720 uses the user id and the password from this record to log into the database instance. Otherwise, the interface module 106 in step 722 uses the user id from this record and the local password to log into the database instance.

The above operations are performed for each database instance identified in step 710, as indicated by step 724. After all of the database instances identified in step 710 have been processed, the operation of flowchart 702 is complete, as indicated by step 726.

The above actions are performed automatically by the interface module 106, such that compensation of different security procedures is transparent to users and clients.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A method for proving a common interface for performing update actions in a plurality of heterogeneous database management systems, wherein data associated with a client is distributed among said plurality of heterogeneous database management systems, comprising the steps of:

(a) simulating support of positioned update actions in any of said heterogeneous database management systems which does not support positioned update actions, by:

(1) accessing metadata that identifies at least one primary key defined for a table;

(2) using the primary keys to obtain record identification information that uniquely identifies a record being modified by a positioned update action, wherein said positioned update action updates a record at a current position of a specified cursor; and (3) requesting that said target database management system modify a record identified by said record identification information.

2. The method of claim 1, further comprising the step of determining whether the information obtained in said step (2) uniquely identifies a record.

3. A system for providing a common interface for performing update actions in a plurality of heterogeneous database management systems, wherein data associated with a client is distributed among said plurality of heterogeneous database management systems, comprising:

means for simulating support of positioned update actions in any of said heterogeneous database management systems which does not support positioned update actions, including;

means for accessing metadata that identifies at least one primary key defined for a table;

means for using the primary keys to obtaining record identification information that uniquely identifies a record being modified by a positioned update action, wherein said positioned update action updates a record at a current position of a specified cursor; and means for requesting that said target database management system modify a record identified by said record identification information.

4. The system of claim 3, further comprising means for determining whether the information obtained by said means for obtaining uniquely identifies a record.

5. A computer program product for use with a computer system, said computer program product comprising:

a computer usable medium having computer readable program code means embodied in said medium for causing the computer system to provide a common interface for performing update actions in a plurality of heterogeneous database management systems, wherein data associated with a client is distributed among said plurality of heterogeneous database management systems, said computer readable program code means comprising:

first computer readable program code means for simulating support of positioned update actions in any of said heterogeneous database management systems which does not support positioned update actions, including:

second computer readable program code means for enabling the computer system to access metadata that identifies at least one primary key defined for a table;

third computer readable program code means for enabling the computer system to use the primary keys to obtain record identification information that uniquely identifies a record being modified by a positioned update action, wherein said positioned update action updates a record at a current position of a specified cursor, and fourth computer readable program code means for enabling the computer system to request that said database management system modify a record identified by said record identification information.

6. The computer program product of claim 5, firer comprising computer readable program code means for enabling the computer system to determine whether the information obtained by said second computer readable program code means uniquely identifies a record.

* * * * *

UNITED STATES PATENT AND TRADEMARK OFFICE
CERTIFICATE OF CORRECTION

PATENT NO. : 5,987,465

DATED : November 16, 1999

INVENTOR(S) : James C. Kleewein, Eileen T. Lin, and Yun Wang

It is certified that error appears in the above-identified patent and that said Letters Patent is hereby corrected as shown below:

On the title page:
Face Page, under "OTHER PUBLICATIONS", 2$^{nd}$ M. Rusinkiewicz et al entry, change "Appraoch" to --Approach--.

Column 5, line 29, "touples" should read --tuples--.

Column 6, line 53, "compensates' " should read --compensates--.

Column 8, line 40, after "hold" " delete the period (".").

Column 9, line 57, "determines" should read --determined--.

Column 13, line 62, after "same" insert --for--.

Column 14, line 20, "in to" should read --into--.

Column 16, line 10, "obtaining" should read --obtain--.

Column 16, line 53, "firer" should read --further--.

Signed and Sealed this

Twenty-second Day of May, 2001

*Attest:*

NICHOLAS P. GODICI

*Attesting Officer*  *Acting Director of the United States Patent and Trademark Office*